United States Patent
Oestreicher et al.

(10) Patent No.: US 10,778,030 B2
(45) Date of Patent: Sep. 15, 2020

(54) DEVICE AND METHOD FOR CHARGING A BATTERY SYSTEM

(71) Applicant: Dr. Ing. h.c. F. Porsche Aktiengesellschaft, Stuttgart (DE)

(72) Inventors: Ralf Oestreicher, Sindelfingen (DE); Dirk Herke, Kirchheim unter Teck (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 20 days.

(21) Appl. No.: 16/137,553

(22) Filed: Sep. 21, 2018

(65) Prior Publication Data

US 2019/0105997 A1    Apr. 11, 2019

(30) Foreign Application Priority Data

Oct. 10, 2017   (DE) .................. 10 2017 123 453

(51) Int. Cl.
| | |
|---|---|
| *H01M 10/46* | (2006.01) |
| *H02J 7/02* | (2016.01) |
| *B60L 53/12* | (2019.01) |
| *H02J 50/10* | (2016.01) |

(52) U.S. Cl.
CPC .............. *H02J 7/025* (2013.01); *B60L 53/12* (2019.02); *H02J 50/10* (2016.02); *B60L 2210/30* (2013.01); *B60L 2210/40* (2013.01)

(58) Field of Classification Search
CPC .. H02J 7/025; H02J 5/005; H02J 50/10; H02J 50/12
USPC .................. 320/104, 108, 140, 142, 145
See application file for complete search history.

(56) References Cited

U.S. PATENT DOCUMENTS

| | | | |
|---|---|---|---|
| 9,381,821 B2* | 7/2016 | Keeling | B60L 11/182 |
| 2013/0207601 A1 | 8/2013 | Wu et al. | |
| 2014/0265615 A1 | 9/2014 | Kim et al. | |
| 2014/0340027 A1 | 11/2014 | Keeling et al. | |
| 2015/0280593 A1 | 10/2015 | Ando et al. | |
| 2015/0311723 A1 | 10/2015 | Raedy et al. | |

FOREIGN PATENT DOCUMENTS

| | | |
|---|---|---|
| DE | 102015205633 A1 | 10/2015 |
| FR | 2981521 A1 | 4/2013 |
| JP | 2013169081 A | 8/2013 |

(Continued)

*Primary Examiner* — Edward Tso
(74) *Attorney, Agent, or Firm* — Leydig, Voit & Mayer, Ltd.

(57) ABSTRACT

A device for charging a battery system of a vehicle is provided. The battery system is configured to be charged by a charging unit, the charging unit is arranged in the vehicle, and the charging unit has an input and an output. The output is configured to be connected in an electrically conductive manner to the battery system in order to charge the battery system, a connection point for a releasable electrically conductive connection for transmitting an AC voltage for charging the battery system is arranged in the vehicle, and a receiver coil is arranged in the vehicle. In the receiver coil a voltage for charging the battery system is configured to be induced, and the input of the charging unit is configured to be connected in an electrically conductive manner to the connection point and/or to the receiver coil in order to charge the battery system.

13 Claims, 1 Drawing Sheet

(56) References Cited

FOREIGN PATENT DOCUMENTS

| JP | 2016524890 A | 8/2016 |
|---|---|---|
| JP | 2017070035 A | 4/2017 |
| WO | 2011127449 A2 | 10/2011 |

\* cited by examiner

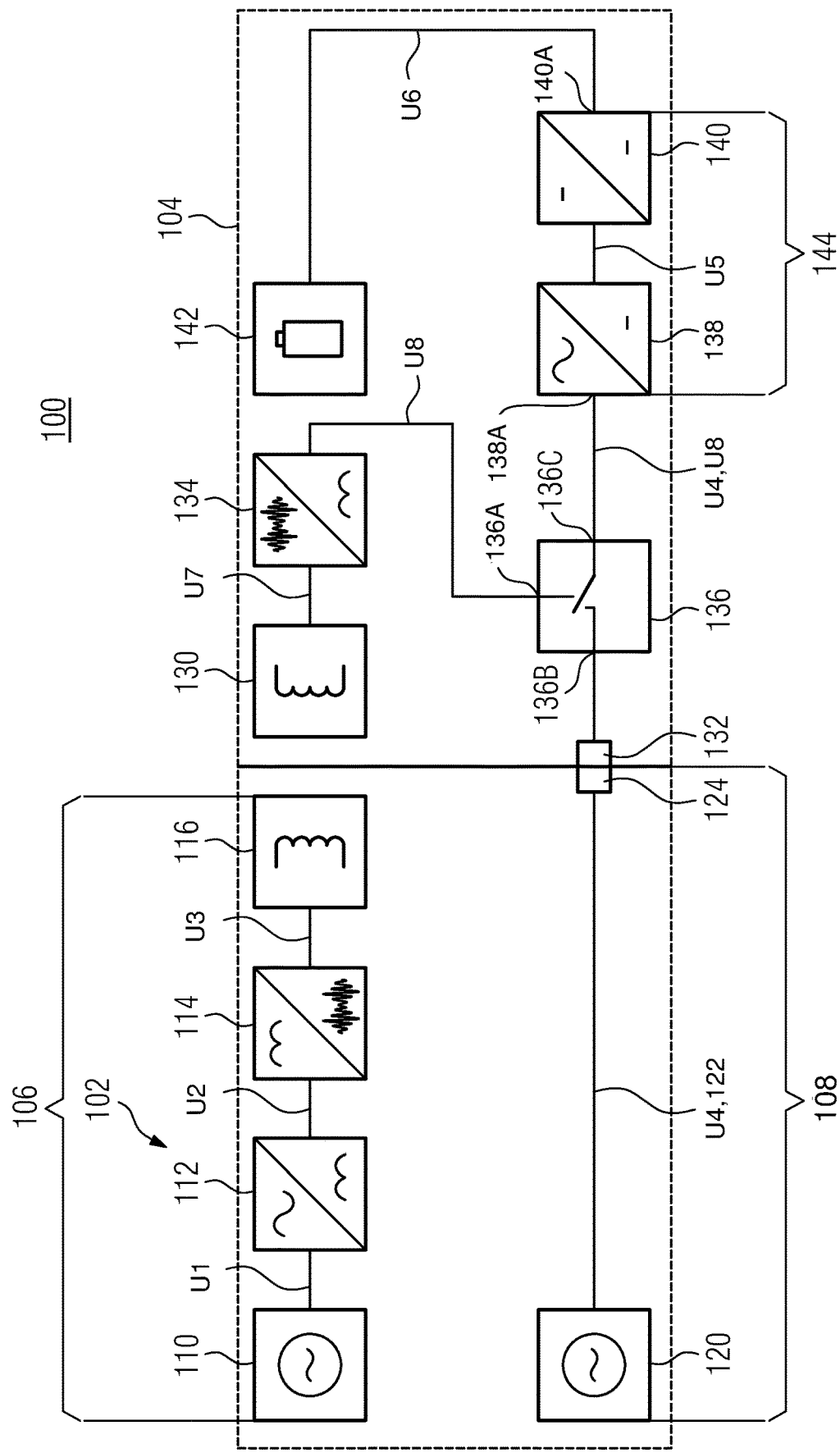

DEVICE AND METHOD FOR CHARGING A BATTERY SYSTEM

CROSS REFERENCE TO RELATED APPLICATIONS

This application claims benefit to German Patent Application No. DE 10 2017 123 453.5, filed Oct. 10, 2017, which is hereby incorporated by reference herein.

FIELD

The invention relates to a method and a device for charging a battery system.

BACKGROUND

Charging systems for the battery system of a vehicle use an inductive and/or conductive connection to connect the battery system of the vehicle to a mains connection point or to another current source of an infrastructure for charging the battery system. The inductive connection uses a transmitter coil and a receiver coil for the electromagnetic transmission of energy in the charging process. The conductive connection uses a wired connection, that is to say a cable, to transmit energy in the charging process. The battery system comprises secondary battery cells, that is to say accumulator cells, which are charged by the charging system.

If charging is provided by way of inductive and conductive charging systems in a vehicle, two different electrical connections to the battery system are provided in the vehicle. Firstly, the transmitter coil of the inductive charging system is connected to the battery system via a rectifier and a filter. Secondly, a socket for the cable is connected to the battery system via a further rectifier, a power factor correction element and a DC voltage converter (DC-to-DC converter).

Current inductive charging systems generate a DC voltage from the 50 Hz or 60 Hz mains voltage by way of rectification, PFC and smoothing. The DC voltage is generated in a DC current intermediate circuit. The DC voltage feeds a high-frequency inverter for supplying the transmitter coil (primary coil). The high-frequency AC voltage at the output of the receiver coil (secondary coil) is rectified and smoothed in the vehicle. In inductive charging systems that are supplied both in single-phase mode and in multiphase mode, additional components are required in the infrastructure for PFC and smoothing, since otherwise the voltage induced in the secondary coil would pulse. These components increase complexity and costs.

FR 02981521 A1, US 2013207601 A1, US 2014265615 A1, US 2014340027 A1 and US 2015311723 A1 disclose inductive charging systems for charging a vehicle battery, in which a DC voltage is generated from the mains voltage by way of rectification and power factor correction, PFC.

SUMMARY

In an embodiment, the present invention provides a device for charging a battery system of a vehicle. The battery system is configured to be charged by a charging unit, the charging unit is arranged in the vehicle, and the charging unit has an input and an output. The output is configured to be connected in an electrically conductive manner to the battery system in order to charge the battery system, a connection point for a releasable electrically conductive connection for transmitting an AC voltage for charging the battery system is arranged in the vehicle, and a receiver coil is arranged in the vehicle. In the receiver coil a voltage for charging the battery system is configured to be induced, and the input of the charging unit is configured to be connected in an electrically conductive manner to the connection point and/or to the receiver coil in order to charge the battery system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE schematically shows part of a charging system according to an embodiment of the invention.

DETAILED DESCRIPTION

Embodiments of the present invention provide improved methods and improved devices for charging a battery system.

According to embodiments of the invention on a vehicle side, devices for charging a battery system of a vehicle are provided, in which the battery system is able to be charged by a charging unit, wherein the charging unit is arranged in the vehicle, wherein the charging unit has an input and an output, wherein the output is able to be connected in an electrically conductive manner to the battery system in order to charge the battery system, wherein a connection point for a releasable electrically conductive connection for transmitting an AC voltage for charging the battery system is arranged in the vehicle, wherein a receiver coil is arranged in the vehicle, in which receiver coil a voltage for charging the battery system is able to be induced, wherein the input of the charging unit is connected in an electrically conductive manner to the connection point or to the receiver coil in order to charge the battery system. As a result, the charging unit, which is present in vehicles having a battery system in any case, is also able to be exploited in the context of inductive charging. A parallel charging circuit for inductive charging is dispensed with.

Preferably, a rectifier is arranged between the receiver coil and the input, wherein the rectifier is configured to convert the induced voltage into a DC voltage. Charging units for wired charging may be connected directly to an AC voltage of a supply network. This AC voltage is rectified in the charging unit. If the induced voltage differs from the AC voltage in terms of voltage and/or frequency, the rectifier converts the induced voltage so that it is able to be transmitted by the charging unit.

Preferably, the charging unit has a common rectifier circuit for the DC voltage and the AC voltage. The rectifier circuit transmits both AC voltage and DC voltage. A rectifier is required in any case for wired charging at an AC mains network. If the inductive charging via the receiver coil is dimensioned such that the induced AC voltage is able to be used like the AC voltage used in wired charging, the same rectifier may be used. As a result, the induced voltage may be used without the rectifier between the receiver coil and the input.

Preferably, the charging unit has a common power factor correction circuit for transmitting the DC voltage and the AC voltage. Preferably, the charging unit has a common smoothing circuit for transmitting the DC voltage and the AC voltage. This reduces the number of components in the vehicle.

Preferably, a switching apparatus is arranged at the input, which switching apparatus is configured to selectively connect the input to the receiver coil or to the connection point in an electrically conductive manner. This enables disconnection of the charging processes.

According to embodiments of the invention on an infrastructure side, devices for inductively charging a battery system are provided, in which devices a mains connection point for a first AC voltage is connected in an electrically conductive manner to an inverter for generating a second AC voltage in order to charge the battery system, wherein the inverter is connected in an electrically conductive manner to a transmitter coil in order to charge the battery system, wherein the second AC voltage is able to be generated by the transmitter coil without power factor correction and smoothing in order to excite an electromagnetic field. Additional components on the infrastructure side are dispensed with, since the common charging unit for both types of charging in the vehicle does not undertake the tasks of the components that are not present in the infrastructure.

Preferably, the mains connection point is connected in an electrically conductive manner to the inverter via a rectifier, wherein the rectifier is configured to convert the first AC voltage into a DC voltage, and wherein the inverter is able to be operated with the DC voltage. The rectification and subsequent inversion offers the possibility of generating an AC voltage with any desired frequency, phase or amplitude for energizing the transmitter coil.

Preferably, the inverter is a direct inverter that is configured to convert the first AC voltage directly into the second AC voltage. The direct inverter does not have a rectifier. DC fault currents are thus avoided.

The task of the components not provided in the infrastructure is in this case performed in the charging unit on the vehicle side. This reduces the complexity of the infrastructure.

According to embodiments of the invention, corresponding charging methods are provided on the vehicle side and on the infrastructure side that are coordinated with one another.

The FIGURE schematically shows part of a charging system 100 that has an infrastructure part 102 and a vehicle part 104.

The infrastructure part 102 is arranged outside a vehicle and comprises a first supply circuit 106 and a second supply circuit 108.

The first supply circuit 106 comprises a first mains connection point 110, which is able to be connected in an electrically conductive manner to a transmitter coil 116 via a first circuit 112 and a second circuit 114. The first mains connection point 110, the first circuit 112, the second circuit 114 and the transmitter coil 116 are connected by way of example via first electrically conductive cables 118.

The first mains connection point 110 delivers by way of example a first AC voltage U1. The first AC voltage U1 is by way of example a single-phase AC voltage of nominally 110 V, 230 V or 240 V at 50 Hz or 60 Hz. The first mains connection point 110 may also deliver multiphase, in particular three-phase, rotary current. Components such as rectifiers, inverters, power factor correction circuits, smoothing circuits and coils for a transmission are explained below with reference to an example based on a single-phase AC voltage. A multiphase transmission is effected correspondingly with components for multiphase AC voltages. To this end, multiphase rectifiers, multiphase inverters, multiphase power factor correction circuits, multiphase smoothing circuits and multiphase coils are used.

The first circuit 112 comprises a rectifier circuit. By way of example, a bridge rectifier is used for single-phase AC voltage. The first circuit 112 converts the first AC voltage U1 into a first DC voltage U2.

The second circuit 114 comprises by way of example a first inverter. The first inverter is configured to convert the first DC voltage U2 from the first rectifier circuit into a second AC voltage U3.

The transmitter coil 116 is configured to induce an alternating electromagnetic field depending on the second AC voltage U3.

The first supply circuit 106 connects the transmitter coil 116, preferably without a power factor correction circuit, to the first mains connection point 110. The first supply circuit 106 connects the transmitter coil 116, preferably without a smoothing circuit, in particular without a smoothing capacitor, to the first mains connection point 110. Preferably, a mains filter is provided in order to avoid feedback into the supply network.

The second supply circuit 108 comprises a second mains connection point 120, which is able to be connected to a socket or, as illustrated in the FIGURE, to a plug 124 via second electrically conductive cables 122.

The transmitter coil 116 constitutes a primary coil for inductively charging a battery system 142, by way of example in a motor vehicle. A secondary coil dimensioned so as to correspond to the primary coil is arranged as a receiver coil 130 in the vehicle part 104, that is to say in the vehicle.

The plug 124 is able to be connected releasably to a socket 132 arranged in the vehicle part 104. The socket 132 or a plug constitute a connection point for charging the battery system 142.

The receiver coil 130 is connected to a first input 136A of an optional switching element 136 via a third circuit 134. The socket 132 is connected to a second input of the optional switching element 136. The optional switching element 136 is configured to connect either the first input or the second input 136B to an output 136C in an electrically conductive manner. As a result, either the socket 132 or the receiver coil 130 is able to be connected to the output 136C. Without a switching element 136, a permanently conductive connection of these components to one another may be provided.

The output 136C is arranged so as to be able to be at least temporarily connected in an electrically conductive manner to a battery system 142 in the vehicle part 104 via a fourth circuit 138 and a fifth circuit 140.

This fourth circuit 138 and the fifth circuit 140 are formed in the vehicle by the charging unit 144 for wired charging, which charging unit has to be provided in any case in a vehicle having an electric drive. An input 138A of the charging unit 144 is matched by way of example to a third AC voltage U4 of nominally 110 V, 230 V or 240 V and 50 Hz or 60 Hz via a charging cable in order to charge the battery system 142. During charging, the third AC voltage U4 is provided at the input 138A of the charging unit 144 from the second mains connection point 120 by way of the charging cable. The fourth circuit 138 preferably comprises the input 138A and a second rectifier circuit, which converts the third AC voltage U4 into a second DC voltage U5. To this end, a bridge circuit is used by way of example. The fourth circuit 138 preferably comprises a power factor correction circuit, which increases the power factor of the third AC voltage U4 before rectification. The fourth circuit 138 preferably comprises a smoothing circuit arranged downstream of the rectification.

The fifth circuit 140 comprises a DC voltage converter (DC-to-DC converter), which is configured to convert the second DC voltage U5 into a third DC voltage U6 at an output 140A of the charging unit 144. The third DC voltage U6 is tailored such that the battery system 142 is able to be charged thereby.

The receiver coil 130 and the transmitter coil 116 interact during the inductive charging of the battery system 142 so as to induce a fourth AC voltage U7 in the receiver coil 130.

The third circuit 134 preferably comprises a third rectifier circuit, configured as a rectifier, for converting the fourth AC voltage U7 into a fourth DC voltage U8.

The receiver coil 130 and the third circuit 134 are dimensioned such that the fourth DC voltage U8 is able to be applied at the input of the fourth circuit 138. This means, in the example, that the second rectifier circuit in the fourth circuit 138 is configured to convert the fourth DC voltage U8 applied at the input side into the second DC voltage U5. Particularly preferably, a bridge circuit is used as rectifier circuit. In a bridge circuit with diodes, a DC voltage is transmitted in any case if all of the diodes in at least one transmission path are forward-biased. As a result, the fourth DC voltage U8 is able to pass through the rectifier circuit substantially unchanged. This means that the second DC voltage U5 and the fourth DC voltage U8 are substantially identical in this case.

However, the second DC voltage U5 pulses on account of the frequency at which the receiver coil 130 was excited, following the rectification at double the excitation frequency. Preferably, the second DC voltage U5 is therefore smoothed. The smoothing circuit required for this purpose is already provided in the charging unit 144, in the example in the fourth circuit 138, for smoothing the mains voltage of 50 Hz or 60 Hz provided by the socket 132 following rectification thereof. The task of smoothing the AC voltage received by the receiver coil 130 is thus undertaken in the vehicle by the charging unit 144 which is present in any case.

The FIGURE further illustrates a circuit for charging the battery system 142 in the vehicle part 104. Further components, which are used by way of example to discharge the battery system, may likewise be present. Electrically conductive connections 148 connect the described components in the vehicle.

The first supply circuit 106 and the second supply circuit 108 may be arranged next to one another in terms of location or remote from one another in terms of location. Parts of the first supply circuit 106 and of the second supply circuit 108 may be arranged in the same housing.

By using the charging unit 144, a DC intermediate circuit in the first supply circuit 106, which would otherwise be necessary, is dispensed with. A rectifier, power factor correction and smoothing in the power section of the infrastructure-side part of the inductive charging system would be necessary here in order to avoid pulsing of the induced voltage. Without a rectifier, DC fault currents are also not able to occur.

Preferably, a controller for actuating the first supply circuit 106 is provided. Preferably, a power supply unit for supplying the controller is designed such that DC fault currents are not able to occur in the event of a fault. This is achieved by way of example by a single-phase supply for the controller from the power supply unit and by dual isolation of the first supply circuit 106. In this case, DC fault current recognition in the first supply circuit 106 may be dispensed with.

In the example, the first inverter is operated with rectified mains voltage. As an alternative thereto, the first inverter may be a direct inverter that is able to be operated with mains voltage. The first inverter is connected to the first mains connection point 110. Mains voltage in this case means by way of example an AC voltage of nominally 110 V, 230 V or 240 V at 50 Hz or 60 Hz.

Preferably, a required power factor of the first inverter is complied with in that an amplitude of the first inverter follows an instantaneous value of the mains voltage or of the rectified mains voltage. If an input of energy in the transmitter coil 116 pulses at double the mains frequency due to an optional rectification, this is not critical for the first supply circuit 106. Instead of rectification, power factor correction and smoothing, preferably only the mains filter for suppressing high-frequency harmonics is provided in the first supply circuit 106, that is to say on the mains side.

For charging, on the infrastructure side, a method for exciting the transmitter coil 116 is applied that is coordinated to a charging method in the vehicle. In this case, the input 138A of the charging unit 144 is connected in an electrically conductive manner to the connection point 132 and/or to the receiver coil 130 for charging. The transmitter coil 116 is preferably excited without power factor correction and without smoothing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for charging a battery system of a vehicle, the device comprising:
   a charging circuit arranged in the vehicle, the charging circuit having an input and an output, the output of the charging circuit being connected in an electrically conductive manner to the battery system so as to provide a charging voltage to charge the battery system;
   a connection point arranged in the vehicle and configured to receive, via a releasable electrically conductive wired connection with a charging system external to the vehicle, a first AC voltage for charging the battery system; and a receiver coil arranged in the vehicle and configured to inductively couple with a transmitter coil external to the vehicle so as to receive, via induction, a second AC voltage for charging the battery system, wherein the input of the charging circuit is configured to be connected in an electrically conductive manner to both the connection point and to the receiver coil, wherein a rectifier is arranged between the receiver coil and the input of the charging circuit, wherein the rectifier is configured to convert the second AC voltage into a DC voltage, and wherein the charging circuit includes a common rectifier circuit for the DC voltage and the first AC voltage.

2. The device as claimed in claim 1, wherein the charging circuit further includes a common power factor correction circuit for transmitting the DC voltage and the first AC voltage.

3. The device as claimed in claim 1, wherein the charging circuit further includes a common smoothing circuit for transmitting the DC voltage and the first AC voltage.

4. The device as claimed in claim 1, further comprising a switch configured to selectively connect, in an electrically conductive manner, the input of the charging circuit to the receiver coil or to the connection point.

5. A method for charging a battery system of a vehicle, the method comprising:
charging the battery system by the device as claimed in claim 1.

6. The device as claimed in claim 1, wherein the charging circuit further includes a common power factor correction circuit for the DC voltage and the first AC voltage and a common smoothing circuit for the DC voltage and the first AC voltage.

7. The device as claimed in claim 1, wherein the common rectifier circuit for the DC voltage and the first AC voltage is configured to:
convert the first AC voltage into a second DC voltage, and
pass the first DC voltage through such that it is substantially unchanged.

8. The device as claimed in claim 7, wherein the receiver coil and the rectifier are dimensioned such that the first DC voltage and the second DC voltage are substantially identical.

9. The device as claimed in claim 7, wherein the second DC voltage is substantially identical to the first DC voltage.

10. The device as claimed in claim 7, wherein the common rectifier circuit is a bridge circuit including a plurality of diodes, wherein all of the diodes in at least one transmission path of the bridge circuit are forward biased.

11. A system for inductively charging a battery system of a vehicle, the system comprising:
a vehicle device, comprising:
a charging circuit arranged in the vehicle, the charging circuit having an input and an output, the output of the charging circuit being connected in an electrically conductive manner to the battery system so as to provide a charging voltage to charge the battery system;
a connection point arranged in the vehicle and configured to receive, via a releasable electrically conductive wired connection with a charging system external to the vehicle, a first AC voltage for charging the battery system; and
a receiver coil arranged in the vehicle and configured to inductively couple with a transmitter coil external to the vehicle so as to receive, via induction, a second AC voltage for charging the battery system,
wherein the input of the charging circuit is configured to be connected in an electrically conductive manner to both the connection point and to the receiver coil,
wherein a rectifier is arranged between the receiver coil and the input of the charging circuit, wherein the rectifier is configured to convert the second AC voltage into a DC voltage, and
wherein the charging circuit includes a common rectifier circuit for the DC voltage and the first AC voltage; and
a charging infrastructure device, comprising:
a mains connection point configured to receive a third AC voltage,
an inverter connected in an electrically conductive manner to the mains connection point and configured to generate a fourth AC voltage, and
a transmitter coil connected in an electrically conductive manner to the inverter, wherein the transmitter coil is configured to generate the fourth AC voltage without power factor correction and smoothing in order to excite an electromagnetic field.

12. The device as claimed in claim 11, further comprising an infrastructure-side rectifier disposed between the mains connection point and the inverter and connected, in an electrically conductive manner, to both the mains connection point and the inverter,
wherein the rectifier is configured to convert the third AC voltage into a DC voltage, and
wherein the inverter is configured to be operated with the DC voltage so as to generate the fourth AC voltage.

13. The device as claimed in claim 11, wherein the inverter is a direct inverter that is configured to convert the third AC voltage directly into the fourth AC voltage.

* * * * *